(12) United States Patent
Gódor et al.

(10) Patent No.: US 10,909,665 B2
(45) Date of Patent: Feb. 2, 2021

(54) METHOD AND DEVICE FOR BALL IMPACT LOCALIZATION

(71) Applicant: Telefonaktiebolaget LM Ericsson (publ), Stockholm (SE)

(72) Inventors: István Gódor, Budapest (HU); Bence Formanek, Budapest (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/479,785

(22) PCT Filed: Mar. 2, 2017

(86) PCT No.: PCT/EP2017/054926
§ 371 (c)(1),
(2) Date: Jul. 22, 2019

(87) PCT Pub. No.: WO2018/157935
PCT Pub. Date: Sep. 7, 2018

(65) Prior Publication Data
US 2020/0349679 A1   Nov. 5, 2020

(51) Int. Cl.
*G06T 5/00*   (2006.01)
*G06T 7/20*   (2017.01)
(Continued)

(52) U.S. Cl.
CPC .............. *G06T 5/003* (2013.01); *G06T 7/207* (2017.01); *G06T 2207/10016* (2013.01);
(Continued)

(58) Field of Classification Search
CPC ........... G06T 5/003; G06T 7/20; G06T 7/207; G06T 2207/20201; G06T 2207/10016;
(Continued)

(56) References Cited

U.S. PATENT DOCUMENTS

| | | | |
|---|---|---|---|
| 7,854,669 B2 | 12/2010 | Marty et al. | |
| 8,184,855 B2 | 5/2012 | Tong et al. | |

(Continued)

FOREIGN PATENT DOCUMENTS

CN    104874170 A    9/2015

OTHER PUBLICATIONS

Demaagd, K. et al., "Extracting Features and Information", Practical Computer Vision with SimpleCV, Jan. 1, 2012, pp. 1-2, O'Reilly.
(Continued)

*Primary Examiner* — Marly S Carmargo
(74) *Attorney, Agent, or Firm* — Coats + Bennett, PLLC (57) ABSTRACT

It is disclosed a method, and a device (10) capable of localizing ball impacts on a surface of an environment. Based on differences between any two consecutive video frames of the video, one or more blurs in the video are detected (704). Parameters of the ball are compared (706) with parameters of the detected one or more moving blurs. When the parameters being compared match, the moving blur for which the parameters match, is associated (708) with ball. Dimensions of the matching blur are determined (710). Based on a change in the dimensions of the moving blur, a ball impact is detected (712). Localizing (714) of the ball impact on a surface, is based on the change in the dimensions of the moving blur being associated with the ball, and environmental parameters. It is an advantage that localization of ball impacts does not require the ball to be continuously visible.

20 Claims, 3 Drawing Sheets

(51) Int. Cl.
  *G06K 9/00* (2006.01)
  *A63B 61/00* (2006.01)
  *A63B 7/06* (2006.01)
  *G06T 7/207* (2017.01)

(52) U.S. Cl.
  CPC ............... *G06T 2207/20201* (2013.01); *G06T 2207/30224* (2013.01); *G06T 2207/30228* (2013.01)

(58) Field of Classification Search
  CPC .. G06T 2207/3024; G06T 2207/30228; G06K 9/00724; A63B 2071/0611; A63B 1/0605; A63B 2024/0028; A63B 2024/0034; A63B 61/00; A63B 7/0608; A63B 7/0656; A63B 2220/00; H04N 7/183
  USPC ....... 348/208.4, 169, 208.14, 579, 135, 154, 348/155, 208.1, 208.113, 208.116, 208.2; 382/103, 107, 236, 255, 264, 254, 263; 473/447, 467
  See application file for complete search history.

(56) References Cited

U.S. PATENT DOCUMENTS

| | | | |
|---|---|---|---|
| 8,908,922 B2* | 12/2014 | Marty | G06K 9/00 382/103 |
| 9,058,670 B2 | 6/2015 | Birenboim et al. | |
| 9,256,957 B1 | 2/2016 | Frey et al. | |
| 10,116,879 B2* | 10/2018 | Huysegems | H04N 5/2625 348/208.99 |
| 10,360,685 B2* | 7/2019 | Marty | A63B 69/00 473/447 |
| 10,537,780 B2* | 1/2020 | Joseph | A63B 69/0021 473/433 |
| 10,762,642 B2* | 9/2020 | Marty | G06T 7/246 382/103 |
| 2005/0215338 A1* | 9/2005 | Miyamoto | A63B 67/02 473/155 |
| 2008/0219509 A1* | 9/2008 | White | A63B 24/0003 382/107 |
| 2013/0039538 A1 | 2/2013 | Johnson et al. | |
| 2013/0172058 A1* | 7/2013 | Carter | A63F 13/04 463/3 |
| 2013/0182756 A1* | 7/2013 | Furlan | G06T 5/002 375/240.02 |
| 2016/0212385 A1* | 7/2016 | Ginsberg | G06T 7/246 348/157 |
| 2018/0137363 A1* | 5/2018 | Campagnoli | G06K 9/00671 348/171 |

OTHER PUBLICATIONS

Caglioti, V. et al., "Recovering Ball Motion From a Single Motion-Blurred Image", Computer Vision and Image Understanding, vol. 113 No. 5, May 1, 2009, pp. 590-597, Elsevier.

* cited by examiner

METHOD AND DEVICE FOR BALL IMPACT LOCALIZATION

TECHNICAL FIELD

This disclosure relates to impact localization. More particularly, it relates to a method and a device capable of, localizing ball impacts on a ball court.

BACKGROUND

Ball detection is a fundamental feature in automated sports analysis. Tracking of the movement of a ball and the ball trajectory are important in team sports such as baseball, basketball and soccer, as well as, for professional and high visibility sports such as tennis.

Information on tracking of the ball and the ball trajectory can be relevant for sports broadcasting companies in order to be able to high-light certain features in illustrations such as goals or tactics.

In other cases, a trainer can see what goes well and what goes wrong during a training session. A referee or an umpire can check whether a ball reached a critical position or not. For instance, it is possible to check whether the ball bounce was in or out, in question of a tennis game.

Existing techniques based on visual analysis, assume that a ball and a target object or surface are clearly visible in one or more video recordings of the game. In order to ensure this, these techniques often apply high-speed cameras or cameras at multiple view-points or high computation hardware.

These techniques are typically limited to professionals and few arenas basically due to high expenses and/or complexity for deploying the techniques widely.

Moreover, techniques focussing on large game fields or courts, have sufficient time to capture the ball on video. However, there are sports with extreme ball speeds at small sized sports courts, such as squash, the time would typically not be sufficient to capture the ball on video. Techniques focussing on large game fields or courts therefore lack applicability at such small sized courts.

There is thus a demand for an improved technique circumventing or at least diminishing issues when determining ball impact localization on a ball court.

SUMMARY

It is an object of exemplary embodiments herein to address at least some of the issues outlined above and to localize ball impacts on a ball court. This object and others are achieved by a device that is capable of localizing ball impacts on a surface of an environment and a method for localizing ball impacts on a surface of an environment, according to the appended independent claims, and by the exemplary embodiments according to the dependent claims.

According to an aspect, the exemplary embodiments provide the method for localizing ball impacts on a surface of an environment. The method comprises obtaining, from a video source, video data of a ball in a ball game, where the video data comprises video frames. The method also comprises detecting one or more moving blurs in the video, based on differences between any two consecutive video frames of the video. The method further comprises comparing parameters of the ball with parameters of the detected one or more moving blurs and associating one of the detected one or more moving blurs with the ball, when the parameters of the ball match the parameters of said one of the detected moving blurs. The method also comprises determining the dimensions of the moving blur being associated with the ball. Moreover, the method comprises detecting a ball impact, based on a change in dimensions of the moving blur being associated with the ball, in the video. In addition, the method comprises localizing the ball impact on a surface, based on the change in the dimensions of the moving blur being associated with the ball, and parameters of the environment.

According to another aspect, the exemplary embodiments provide a device capable of localizing ball impacts on a surface of an environment. The device comprises a video input module that is adapted to obtain, from a video source, video data of a ball in a ball game, where the video data comprises video frames. The device also comprises a location analysis module that is adapted to be connected to the video input module. The location analysis module is adapted to detect one or more moving blurs in the video, based on differences between any two consecutive video frames of the video, and to compare parameters of the ball with parameters of the detected one or more moving blurs. The location analysis module is adapted to associate one of the detected moving blurs with the ball, when the parameters of the ball match the parameters of said one of the detected moving blurs, and to determine the dimensions of the moving blur being associated with the ball. The location analysis module is also adapted to detect a ball impact, based on a change in dimensions of the moving blur being associated with the ball, in the video. In addition, the location analysis module is also adapted to localize the ball impact on a surface, based on the change in dimensions of the moving blur being associated with the ball, and parameters of the environment.

The embodiments as described have one or more of the following advantages and preferable features:

It is technically simple and easily scalable, and provides a low cost technology to localize ball impacts of surfaces of any sport facility or environment available.

The technology for determining the position of ball impacts is computationally cheap, such that it can be implemented in embedded devices. Such devices comprise deployments in the cloud and in the cloud edge.

A further advantage is that the localization of ball impacts does not require the ball to be continuously visible in the video.

Yet a further advantage is that the localization of ball impacts does not require the ball to be visible at the time the ball impacts on a surface.

BRIEF DESCRIPTION OF THE DRAWINGS

Embodiments will now be described in more detail, and with reference to the accompanying drawings, in which.

DETAILED DESCRIPTION

In the following description, exemplary embodiments will be described in more detail, with reference to accompanying drawings. For the purpose of explanation and not limitation, specific details are set forth, such as particular examples and techniques in order to provide a thorough understanding.

There is thus a demand for an improved technique circumventing or at least diminishing issues when determining ball impact localization on a surface of an environment, such as a ball court or a playing-ground.

The present disclosure localizes ball impacts on an environment, based on video input and a description of the environment. The present disclosure does not rely on continuous visibility of the ball in a video from a video source. Rather, it is sufficient that the ball is visible by only a few frames for the reason that only parts of the video need to be used, to localize ball impacts on the environment. For this reason, localizing ball impacts according to the present disclosure is computationally cheap. This is clearly advantageous.

Since the technique described herein is computationally cheap, this technique is implementable in commodity hardware, according to some embodiments of the present disclosure.

This technique is also able to host algorithmic solutions to identify where the ball impacts walls or the ground or any other surface(s). The algorithmic solutions may be hosted on a single hardware or may be hosted on distributed hardware and/or remotely in relation to the ball court or playing-ground, in a cloud environment.

The present disclosure can be successfully applied when deciding whether a serve was correct, i.e. whether, or not, a ball impact of the served ball, was within an allowed region of an environment, such as a ball court or a playing-ground. Decisions whether a ball impact is inside or outside a certain region may otherwise be disputed by players of a game. The present disclosure thus brings a valuable aid to an umpire or referee of the game, whom can decide whether a ball impact was inside or outside a certain region, based on facts rather than on judgements.

It is appreciated that the present disclosure can be advantageously used in several games wherein it can be questioned whether a ball, or even an object bounced or impacted inside or outside a certain region, such as on one side or the other, of line.

For example, imagine kids playing kicking a ball, or playing soccer, against a single wall, the wall having thereupon painted, a goal or the frames of the goal. It is then up to the players to decide whether a ball that is kicked scored a goal or not. The present disclosure is here advantageously applicable.

Similarly, the present disclosure is applicable to ball sports, other than soccer or squash, such as handball, tennis and table tennis. Also, players can have their shooting precision analysed during training. It is noted that there are a number of ball sports or games, where players thereof can benefit from practicing kicking or throwing a ball against a wall.

Figure 1A:
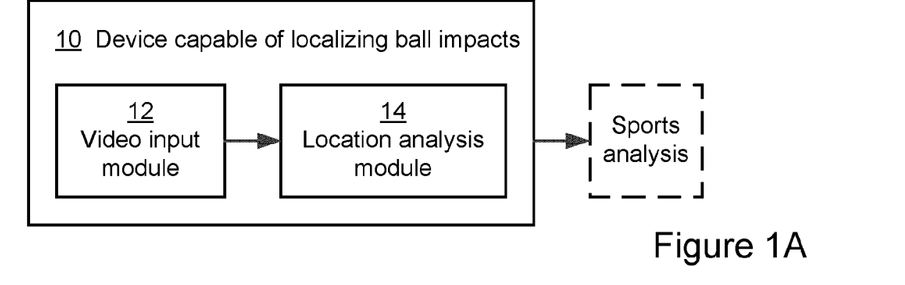
FIGS. 1A and 1B schematically illustrate devices capable of localizing ball impacts, according to embodiments of the present disclosure.

FIG. 1A is a schematic illustration of a device 10 that is capable of localizing ball impacts on a surface of an environment, according to some embodiments of the present invention. This device can advantageously be used to provide localization information of ball impacts on the surface of an environment. Sports analysis of such information enables visualization of ball impacts on the surface.

The device 10 that is capable of localizing ball impacts on a surface of an environment comprises a video input module 12 that is adapted to obtain video data, from a video source, of a ball in a ball game. The video data comprises video frames. The device 10 also comprises a location analysis module 14 that is adapted to be connected to the video input module 12. The location analysis module 14 is adapted to detect one or more moving blurs in the video, based on differences between any two consecutive video frames of the video. It is noted that objects that are not moving between consecutive video frames will be cancelled when calculating differences between consecutive video frames. For this reason, moving objects may be detected based on differences between consecutive video frames.

Further, the present disclosure is particularly suited for a time resolution, i.e. a frame rate, by which a ball when travelling at a nominal speed will be represented by a blur on a video recording, rather than a sharp image of the ball. A ball moving at a nominal speed travels a distance during a time duration that equals 1/(frame rate) of the video frames. Since ball is moving during that time duration, the ball is represented by a blurred image of a sharp image, i.e. a blur, which blur is typically elongated in one dimension. As will be described further below, the direction of the elongation equals to the direction of the moving ball.

The location analysis module 14 may also be adapted to identify the differences between any two consecutive video frames of the video data, and to calculate a logical AND-operation of any consecutive two of said differences when detecting said one or more moving blurs in the video.

The location analysis module 14 is also adapted to compare parameters of the ball with parameters of the detected one or more moving blurs. The location analysis module may also be adapted to compare brightness, colour, and/or size of the ball with brightness, colour and/or size of the detected one or more moving blurs.

Further, the location analysis module 14 is adapted to associate one of the detected moving blurs with the ball, when the parameters of the ball match the parameters of said one of the detected moving blurs. The location analysis module 14 may also be adapted to identify said one of the detected moving blurs as a video recording of the ball in the video.

Also, the location analysis module 14 is adapted to determine the dimensions of the moving blur being associated with the ball. The location analysis module 14 may also be adapted to determine an extension of the moving blur and direction of said extension of the moving blur.

Moreover, the location analysis module 14 is adapted to detect a ball impact, based on a change in dimensions of the moving blur being associated with the ball, in the video. The location analysis module 14 may also be adapted to detect a ball impact, based on the change in the extension, and/or a change of the direction of the extension of the moving blur.

In addition, the location analysis module 14 is adapted to localize the ball impact on a surface, based on the change in dimensions of the moving blur being associated with the ball, and parameters of the environment.

The video input module 12 of the device may be adapted to obtain the video data from one or more cameras or from a video stream.

Each video frame of said video data may comprise a matrix of video pixels.

The parameters of the environment may comprise physical coordinates of the surface.

The surface of the environment may comprise a surface of a ball court or a playing ground.

Figure 1B:
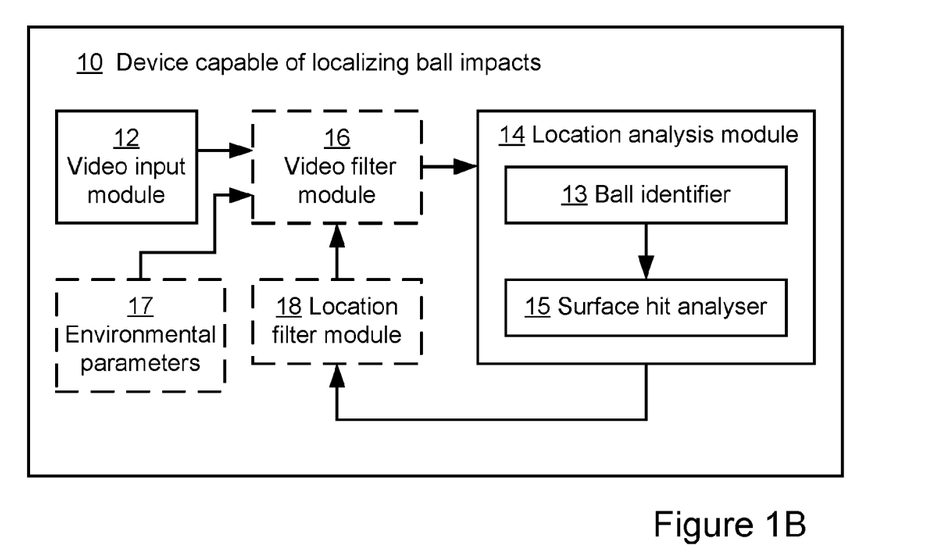

FIG. 1B schematically illustrates a device 10 that is capable of localizing ball impacts on a surface of an environment, according to some further embodiments of the present disclosure. Similar to the device as presented in FIG. 1A, device 10 of FIG. 1B comprises a video input module 12 that is adapted to obtain video data, from a video source, of a ball in a ball game. The device 10 further comprises a location analysis module 14 that is adapted to be connected to the video input module 12.

In these further embodiments, the location analysis module 14 comprises a ball identifier 13 and surface hit analyser 15, which surface hit analyser is connected to the ball identifier 13. In addition the device 10 may also comprises a video filter module 16 that is adapted to be connected between the video input module 12 and the location analysis module 14. In addition the device 10 may also comprise a location filter module 18 that is connected between the location analysis module 14 and the video filter module 16. Further, the device 10 may also comprise environmental parameters 17, providing information about an environment comprising one or more surface on which the ball is impacting, to the video filter module 16.

The video input module 12 is adapted to obtain video input from a video source. The video input may be provided from one or more video cameras arranged to record a sports game at a ball court or a playing-ground. The video filter module 16 is adapted to select parts of the video frames to be used for localization analysis to be performed by the location analysis module 14. The location analysis module 14 may provide information to the location filter module 18 that can provide feedback to the video filter module 16 for tuning in order to provide an improved location performance. Information about the location of the ball when impacting on a surface of the environment can thus be provided for further sports analysis, which further sports analysis is outside the scope of the present disclosure.

The video input may comprise multiple video streams or camera views, which further can enhance an efficiency of the localization of ball impacts on the surface of the ball court or playing-ground.

It is further noted that location information of ball impacts can be utilized by a large variety of further devices or systems, in addition to the noted sports analysis from above. Such devices or systems could comprise gaming systems, visualization systems, etc. associated with sports or other fields in which there is an interest in detection of impact location of a ball.

The environmental parameters 17 may be obtained directly by the location analysis module 14, or alternatively when a video filter module is used, by the video filter module 16. Further environmental parameters can comprise different types of parameters. One type of parameters comprises court or playing-ground attributes, for example information about a surface and its location. Court parameters may comprise one or more of: the dimensions of the court or playing ground, the colour of the surface, the colour of a wall on the court, and the colour on the balls being, or to be, played with.

The court attributes may comprise technical parameters of a video input target surface onto which one or more cameras are focusing. The court attributes may also comprise technical parameters of the resolution of the cameras, both in time, i.e. temporal resolution such as frame rate, and spatial resolution such as number of pixels used by each camera.

Another type of environmental parameters comprises player attributes, which may comprise the colour of the sports dress or any other descriptor of the players, enabling identifying the players on the court or playing-ground. Player attributes may comprise the height of the players and how fast the player can hit the ball, or the speed with which the player can send the ball.

A further type of environmental parameters may comprise player position, which can be the actual position of one or more players on the court or the playing-ground.

Based on the above environmental parameter, it can be calculated how much and what part of a surface of a ground or a wall, or any other surface in question, is hidden by silhouettes of the players. As will be described down below, it is of importance how the ball is captured in the video frames, i.e. the image of the ball in the video frames. It is thus of interest knowing when a silhouette of for instance a player at least partially hides the ball, such that the cameras cannot capture a blur of the ball in a particular video frame.

The video filter module 16 is adapted to receive environmental parameters 17 and information from the location filter module 18, when present. Depending on environmental requirements and/or the location filter, the video filter module 16 can select which surface of the ball court or playing ground should be focussed on.

For instance, a person using a device can define a surface that is of interest to that person, or of interest to an external sports analysis system. The localization of ball impacts may then be focussed on that particular surface or wall.

Also, the localization of ball impacts can give information which surface a ball is moving towards.

As mentioned above, the video filter module 16 may obtain video input from several video cameras. Based on information about which surface should be focussed on, the video filter module 16 may select which video input should be used, even at any particular moment.

Moreover, the video filter module 16 is adapted to determine expected dynamics of the ball. For instance, the video filter module 16 may determine the distance that the ball can travel between consecutive video frames.

It is appreciated that the present disclosure is especially suited for a temporal resolution of the video input, i.e. the frame rate, with which a captured blur of the ball per video frame is elongated in shape, and wherein the dimensions of the extension is a measure of the direction of the moving ball.

If a high temporal resolution were to be used, each captured image in of the ball of the video frames would typically be circular. Such an image shape cannot be used to determine the direction of a moving ball.

Further, the video filter module 16 may thus determine how long and how wide an image of a travelling ball is expected to be on a video frame when moving towards a surface, and when it is moving from the surface after having bounced on the surface. It is here noticed that since the ball loses energy in the impact on the surface, the speed from the surface is lower than the speed towards the surface. This difference in speed may be visualized in the blur of the moving ball, in that the blur of the ball when moving from the surface may be shorter than the blur of the ball moving towards the surface. The ball simply travels longer per time unit towards the surface, as compared to from the surface.

Further, the video filter module 16 may also determine the expected size in pixels of the ball, based on the spatial resolution, i.e. the number of pixels per video frame. The expected size in pixels is especially of interest at the time when the ball impacts on the surface in question, when it is to be decided whether the ball was inside or outside a certain region, alternatively beyond a line, or not.

The video filter module 16 may hence provide the location analysis module 14 with video input data that is filtered, and based on the environmental parameters 17. As presented above, the location analysis module 14 may comprise ball identifier 13 and surface hit analyser 15 functionalities.

The ball identifier 13 within the location analysis module 14 may be adapted to identify the differences between any two consecutive video frames of the video data, and to calculate a logical AND-operation of any consecutive two of said differences when detecting said one or more moving blurs in the video. The ball identifier 13 may also be adapted to compare brightness, colour, and/or size of the ball with brightness, colour and/or size of the detected one or more moving blurs and to identify said one of the detected moving blurs as a video recording of the ball in the video. In addition, the ball identifier 13 may also be adapted to determine an extension of the moving blur and direction of said extension of the moving blur.

The surface hit analyser 15 within the location analysis module 14 may be adapted to detect a ball impact, based on the change in the extension, and/or a change of the direction of the moving blur.

Figure 2:
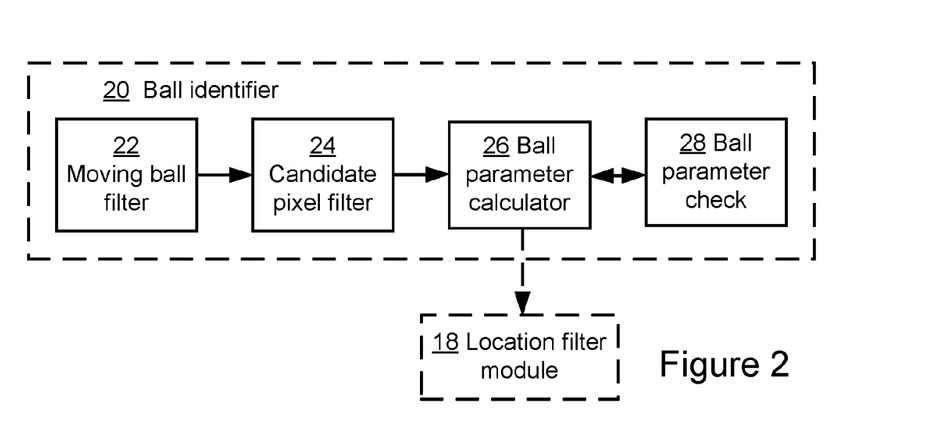
FIG. 2 schematically illustrates an example of a ball identifier, related to some embodiments of the present disclosure.

With reference to FIG. 2 an example of the ball identifier will be presented in more detail.

FIG. 2 schematically illustrates an example of the ball identifier 20, related to some embodiments of the present disclosure. The ball identifier 20 is typically a logical entity located within the location analysis module 14. The ball identifier 20 comprises a moving ball filter 22, a candidate pixel filter 24, a ball parameter calculator 26 and a ball parameter check 28 component. Results from the ball parameter calculator 26 can further be provided to the location filter module 18.

The moving ball filter 22 is adapted to identify what parts of a video frame has been changed, as compared the previous video frame. A tailored method for identifying changes between consecutive video frames is implemented in the moving ball filter. It is a pre-requisite that the ball, or target object, travels faster than most other, or all other, objects detectable in the video input. In the example below, the target object is a ball.

Action A: Consider three consecutive video frames in order to identify one or more moving blurs. Each video frame can be considered as a matrix of pixel intensity values.

Action B: Identify differences between any two consecutive video frames. Thus, first identify any difference between a first ($1^{st}$) and a second ($2^{nd}$) frame, denoted by $D_{12}$. The difference may be calculated by subtracting the intensity matrix of the first video frame from the intensity matrix of the second video frame. Also, identify any difference between the second the ($2^{nd}$) video frame and the third ($3^{rd}$) video frame, denoted by $D_{23}$. Now determine the absolute value of said identified differences.

Action C: Calculating logical AND-operation of $D_{12}$ and $D_{23}$, where the result from the operation is denoted D. The logical AND-operation can be considered to be a minimum operator, calculating the minimum per pixel between the two identified differences $D_{12}$ and $D_{23}$.

When D comprises values greater than zero, this means that the is identifies a difference between the first and the second video frame, as well as a difference between the second and the third video frame, which means that a moving blur is identified in the second video frame. It is noted that these calculation of the identifying a moving blur is computationally cheap, which brings the present disclosure to be implementable in commodity hardware devices.

It is noted that identified differences between any two consecutive video frames, may be used twice when calculating the logical AND operation of any two consecutive differences. This is since the logical AND operation, D, is calculated of $D_{n,n+1}$ and $D_{n-1,n}$ for any number of n. For example, when n=K, the logical AND-operation is calculated of $D_{K, K+1}$ and $D_{K-1,K}$ and when n=K+1 the logical AND-operation is calculated of $D_{K+1,K+2}$ and $D_{K,K+1}$. The identified difference $D_{K,K+1}$ is thus present in both calculations of the logical AND-operations, which was to be proven.

For this reason, identified differences between two consecutive video frames are preferably stored and used for a consecutive logical AND-operation calculation. This will decrease the time required to calculate the logical AND-operation of consecutive differences.

Further, the candidate pixel filter 24 of the ball identifier 20 is adapted to keep only those pixels of D, or of the blur, for further analysis which can be candidates for the ball. For this purpose the candidate pixel filter may perform:

Action A: To filter out those pixels from D, for example for setting the intensity values to zero for them, which are hidden by the silhouettes of one or more players as defined by the environmental parameter values, creating a modified D.

Action B: To filter out those pixels from the modified D, which are below a given threshold which is to be defined during the process of ball dynamics on video. This threshold may be defined, for instance in an iterative process or via other fine-tuned maximum likelihood (ML) algorithms.

Action C: To filter out those pixels from the modified D, which are far from the colour-space that is defined by the ball that used in the game. The colour of a moving blur to be associated with moving ball needs to match the colour of the ball, else the blur shall not be associated with the ball. Action C may also comprise to filter out those pixels from the modified D, which do not match the brightness that is defined by the ball that is used in the game. Similarly, action C may in addition also comprise to filter out those pixels from the modified D, which do not match the size that is defined by the ball that is used in the game.

The candidate pixel filter 24 may also filter out those pixels form the modified D, whose neighbours have zero intensity value, and which hence were eliminated in any of the above steps. It has been found that such pixels may practically be noise. An additional learning process can determine that how many of the number of possible neighbours of a pixel should have zero intensity, i.e. be empty.

The ball identifier 20 also comprises a ball parameter calculator 26. This ball parameter calculator may be adapted to associate one of the one or more detected moving blurs with the ball, when the parameters of the ball match the parameters of said one of the one or more detected blurs. The ball parameter calculator may also be adapted to identify said one of the detected moving blurs as a video recording of the ball in the video. The candidate pixel filter 24 above may here assist to ensure that the identified one of the detected moving blur corresponds to the moving ball.

Further, the ball parameter calculator 26 may also be adapted to determine the dimensions of the moving blur that is associated with the ball. The ball parameter calculator thus determines the track of the ball from the geometry of the remaining non-zero pixels of D of the blur. The ball parameter calculator 26 may calculate dimensions of the blur, for instance the shortest and largest diameters, or measures, of the blur. The ball parameter calculator 26 may hereby determine an extension of the moving blur and the direction of the moving blur. The direction of the blur may be determined by considering the two farthest pixels along the largest diameter, or measure, and determining a straight line going through said two farthest pixels as the direction of the blur. The ball parameter calculator 26 may also be adapted to determine extreme points of the blur, such as top, bottom, left most or right most pixels of the blur.

Also, the ball identifier 20 also comprises a ball, or blur, parameter check 28. This ball parameter check 28 is adapted to determine whether the parameters as extracted from the identified blur are in line with ball dynamics in the video, for instance whether the blur is in line with a ball rally, or not. The ball parameter check 28 may thus determine whether any ball, or blur, parameter is inconsistent with the ball dynamics, or not. If any ball or blur parameter is inconsistent with the ball dynamics, no further analysis of the calculated D of the video frame is performed. The ball parameter check 28 may also conclude, when the dimensions of the blur are equal, i.e. the blur being roundish, that an impact of the ball has been caught in the video frame of D, and that a tag of ball impact can be set to true. In this case, the video has caught the moment of the impact on a surface of the environment, for which reason the ball momentarily seems to be frozen or not to be moving.

Information from the ball parameter calculator 26 may be provided to the location filter module 18 for improving of the performance of the localization of ball impacts, as mentioned above.

Figure 3:
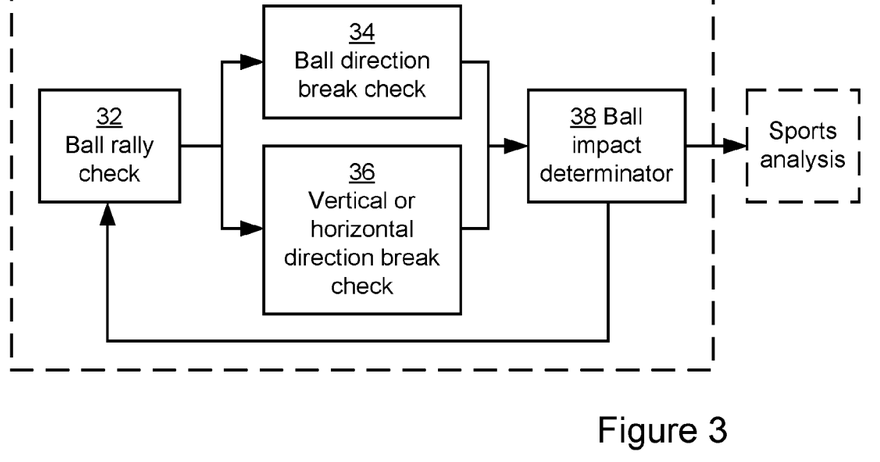
FIG. 3 schematically illustrates an example of a surface hit analyser, related to some embodiments of the present disclosure.

FIG. 3 schematically illustrates an example of a surface hit analyser 30, related to some embodiments of the present disclosure. The surface hit analyser 30 is adapted to detect a ball impact based on a change in dimensions of the moving blur that is associated with the ball, in the video. The surface hit analyser 30 may also be adapted to detect the ball impact based on the change if the extension, and/or a change of the direction of the extension of the moving blur.

The surface hit analyser 30 may also be adapted to localise the ball impact on a surface, based on changes in dimensions of the moving blur associated with the ball and parameters of the environment, of for instance a ball court or a playing-ground.

The surface hit analyser 30 example of FIG. 3 comprises a ball rally check 32 that is adapted to determine whether the ball or blur is going towards a surface in question or has already been reflected, or bounced against the surface. The ball rally check may be a state machine that stores information whether the ball or blur is going to or from a surface in question.

In the case the sports or play in question comprises multiple surfaces of interest, multiple surfaces can be analysed. In such cases, the surface analysis is preferably performed for each surface in parallel. However, a check rally function for a given surface may report its status towards other surfaces of said multiple surfaces to improve the state machine of said other surfaces.

Also, if it is determined that the ball or blur is going towards a wall, then the state machine can wait a predefined number of timeslots, or ball frames, before analysing further frames of the video to save processing power. The number of time slots may be learned from ball dynamics in the video. After having determined that the ball is going towards a surface, it may simply take some time until the ball is going from the surface or a wall in question. This time can be learned from the ball dynamics in the video.

The surface hit analyser 30 may also be adapted to check whether a ball impact is detected between the analyses of D from one video frame and consecutively preceding video frame. A ball impact implies a change in direction of the ball, when recorded from at least two different directions. An impact may thus be detected by detecting a change in the dimensions of the moving blur that is associated with the ball, between two consecutive video frames.

Further, two types of directional breaks of the direction of the blur that is associated with the ball is envisaged. The surface hit analysis 30 comprises a ball direction break check 34 component. The surface hit analysis 30 may also comprise a vertical or horizontal direction break check 36 component.

The ball direction break check 34 is adapted to determine whether the direction of the blur, or the dimensions of the blur changed dramatically, from a video frame to a consecutive video frame. If a change in the direction of the blur, or the dimensions of the blur changed dramatically, it is concluded that an impact on a surface is detected. There is thus a break in the trajectory of the blur.

Considering ballistics of the blur, the intersection of the directions of blurs or D, from two consecutive video frames defines the position of the impact. The ballistics of the blur may be simplified and the trajectory of the blur may be approximated with a straight, in order to speed up the localization of ball impacts. Such an approximation is considered to be technically reasonable since the distance by which a ball typically travels between any two video frames is relatively short.

It is noted that if a ball game is recorded in at least two different directions, the ball direction break check 34 may be sufficient to determine the location of the ball impact on the surface.

If the ball game is recorded in one single direction, for instance by using a single video camera, or at certain special camera installation of two cameras, a further component is envisaged. The surface hit analyser 30 may thus also comprise a vertical or horizontal direction break check 36 component that is adapted to assist in the detecting of a ball impact on a surface. It can happen that no clear direction change of the blur is visible, for the reason that the ball of the blur, is going forth and back along the same line, being the ballistic trajectory. In that case, no intersection of directions can be defined. Nevertheless, in such a case, the extreme points of the extension of the blur from one or more video frames can denote the location of the impact.

Moreover, in the case the detected blur of the ball is roundish in shape, the ball impact is caught on that particular video frame. In such a case, the location of the ball impact is simply given by the middle of the blurs' position on the frame.

Also, when a video of a ball game is recorded using multiple cameras for the same surface, then the localization of ball impact from each camera may be combined in order to improve the performance or facilitate calculation of the moment of the impact.

The surface hit analyser 30 may also comprise a ball impact determinator 38 that is adapted to receive ball direction break information from the ball direction break check 34 component, or to receive direction break information from the vertical or horizontal direction break check 36 component. The ball impact determinator 38 is also connected to the ball rally check 32 component.

The ball impact determinator 38 may be adapted to localize the ball impact on a surface, based the change in dimensions of the blur that is associated with the ball, and parameters of the environment.

The ball impact determinator 38 is also adapted to propagate ball impact information to the ball rally check 32 component when a new surface hit is determined, and to the sports analysis that is connected to the surface hit analyser 30.

Figure 4A:
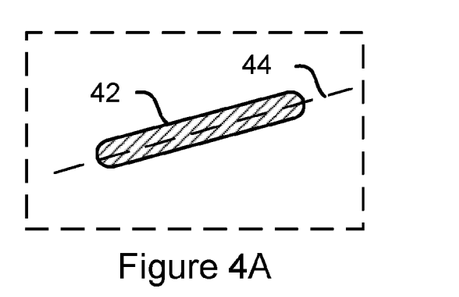
FIGS. 4A, 4B, 5 and 6 schematically illustrate blurs related to some embodiments of the present disclosure.
Figure 4B:
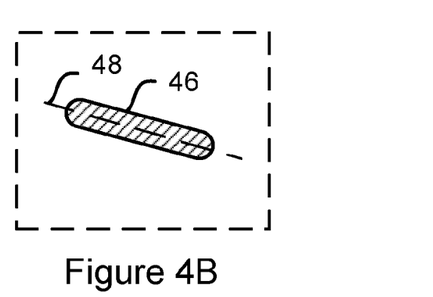

FIGS. 4A and 4B 6 schematically illustrate blurs related to some embodiments of the present disclosure. FIG. 4A depicts a blur 42 having an extension that is directed along the line 44. In this example the blur is associated with a ball that is travelling from lower left to upper right of the video frame. FIG. 4B depicts a blur 46 that is associated with a ball that is travelling from lower right to upper left, i.e. in the direction 48 of the extension of the blur.

Thus FIG. 4A illustrates the blur of a ball travelling towards a surface, and FIG. 4B illustrates the blur of the ball that is now travelling in a direction 48, that is a reflection of the direction 44. It is furthermore noted that the extension of the blur in FIG. 4A is longer than the extension of the blur in FIG. 4B. The blur 46 in FIG. 4B is thus shorter than the blur 42 in FIG. 4A, which is a consequence of the ball travelling at a reduced speed after a ball impact. A ball impact can moreover be detected, based on the change on direction of the blurs of consecutive video frames.

Figure 5:
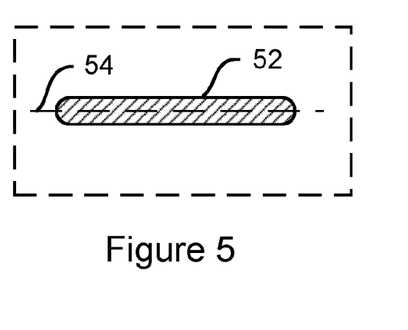

FIG. 5 also illustrates a blur 52 related to an embodiment of the present disclosure. The extension of the blur 52 is directed along a line 54. Since the blur is associated with a ball, the extension of the blur corresponds to the direction of the ball. FIG. 5 thus illustrates a horizontal ball direction, for which reason no change in direction will be detectable between consecutive video frames. In this case, extreme positions of the blur from consecutive video frames may however denote the location of an impact of the ball.

Figure 6:
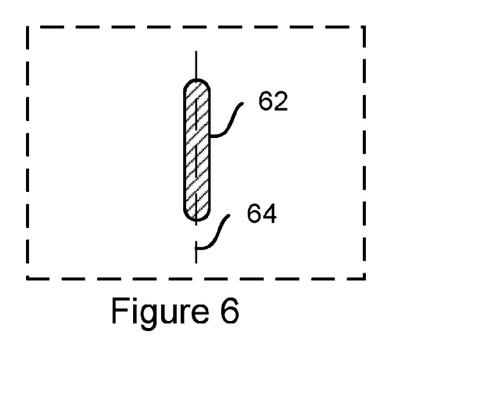

Similarly, FIG. 6 illustrates a blur 62 that is related to an embodiment of the present disclosure. The extension of the blur 62 is directed along a line 64. The extension of the blur corresponds to the direction of the ball. FIG. 6 thus illustrates a vertical ball direction, for which reason no change in direction will be detectable between consecutive video frames. In this case, extreme positions of the blur from consecutive video frames may however denote the location of an impact of the ball, as mentioned above.

Figure 7:
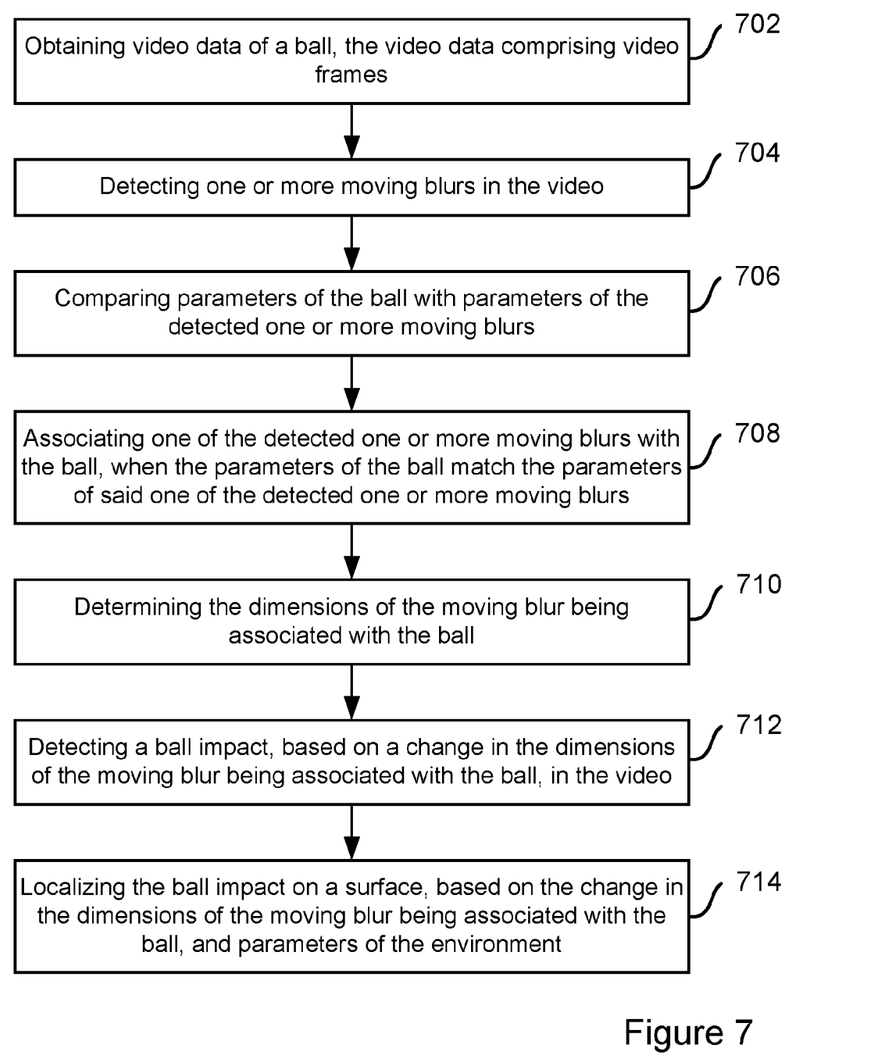
FIG. 7 schematically presents a flowchart of a method for localizing ball impacts according to some embodiments of the present disclosure.

FIG. 7 schematically presents a flowchart of a method for localizing ball impacts on a surface of an environment, according to some embodiments of the present disclosure. The flowchart comprises:

Action 702: Obtaining, from a video source, video data of a ball in a ball game, where the video data comprises video frames. The video source may be one or more cameras or a video stream. Hence, this action may also comprise obtaining video data from one or more cameras or from a video stream.

Action 704: Detecting one or more moving blurs in the video, based on differences between any two consecutive video frames of the video. Action 704 may also comprise identifying the differences between any two consecutive video frames, and calculating a logical AND-operation of any consecutive two of said differences.

Action 706: Comparing parameters of the ball with parameters of the detected one or more moving blurs. Action 706 may also comprise comparing one or more parameters in a group comprising: brightness, colour and size, of the ball, with one or more parameters in a group comprising: brightness, colour and size, of the detected one or more moving blurs. Action 708: Associating one of the detected one or more moving blurs with the ball, when the parameters of the ball match the parameters of said one of the detected moving blurs. Action 708 may also comprise identifying said one of the detected moving blurs as a video recording of the ball in the video.

Action 710: Determining the dimensions of the moving blur being associated with the ball. Action 710 may also comprise determining an extension of the moving blur and direction of said extension of the moving blur.

Action 712: Detecting a ball impact, based on a change in dimensions of the moving blur being associated with the ball, in the video. Action 712 may also comprise detecting a ball impact, based on the change in the extension, and/or a change of the direction of the extension of the moving blur.

Action 714: Localizing the ball impact on a surface, based on the change in the dimensions of the moving blur being associated with the ball, and parameters of the environment.

It is noted that each video frame of said video data may comprise a matrix of video pixels.

The environmental parameters may comprise physical coordinates of the surface. The surface of the environment may comprise a surface of a ball court or a playing ground.

Figure 8:
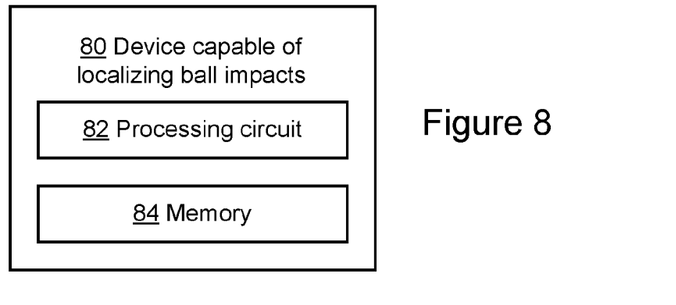
FIG. 8 schematically presents a device capable of localizing ball impacts, according to some further embodiments of the present disclosure.

FIG. 8 schematically presents a device 80 capable of localizing ball impacts on a surface of an environment, according to some further embodiments of the present disclosure. This device comprises a processing circuit 82 and a memory 84, wherein said memory contains instructions executable by said processing circuit 82 whereby said device 80 is operative to obtain, from a video source, video data of a ball in a ball game, where the video data comprises video frames. The device 80 is further operative to detect one or more moving blurs in the video, based on differences between any two consecutive video frames of the video and to compare parameters of the ball with parameters of the detected one or more moving blurs. By the instructions executable by the processing circuit 82, the device is further operative to associate one of the detected moving blurs with the ball, when the parameters of the ball match the parameters of said one of the detected moving blurs. The device is further operative to determine the dimensions of the moving blur being associated with the ball, and to detect a ball impact, based on a change in dimensions of the moving blur being associated with the ball, in the video. In addition, by the instructions executable by the processing circuit 82, the device is further operative to localize the ball impact on a surface, based on the change in dimensions of the moving blur being associated with the ball, and parameters of the environment.

The following disclosure also comprises a computer program, comprising computer readable code which when run on at least one processing circuit, causes the at least one processing circuit to carry out the method for localizing ball impacts on a surface of an environment, wherein the method at least comprises obtaining, from a video source, video data of a ball in a ball game, where the video data comprises video frames, and detecting one or more moving blurs in the video, based on differences between any two consecutive video frames of the video. The method also comprises comparing parameters of the ball with parameters of the detected one or more moving blurs; and associating one of the detected one or more moving blurs with the ball, when the parameters of the ball match the parameters of said one of the detected moving blurs. The method also comprises determining the dimensions of the moving blur being associated with the ball, and detecting a ball impact, based on a change in dimensions of the moving blur being associated with the ball, in the video. In addition, the method comprises localizing the ball impact on a surface, based on the change in the dimensions of the moving blur being associated with the ball, and parameters of the environment.

The following disclosure also comprises a computer program product that comprises a computer-readable storage medium and the computer program of above, wherein the computer program is stored on the computer-readable storage medium.

Furthermore, the present disclosure also comprises a device that is capable of localizing ball impacts on a surface of an environment. The device is adapted to obtaining, from a video source, video data of a ball in a ball game, where the video data comprises video frames. The device is adapted to detect one or more moving blurs in the video, based on differences between any two consecutive video frames of the video. The device is also adapted to compare parameters of the ball with parameters of the detected one or more moving blurs, and to associate one of the detected one or more moving blurs with the ball, when the parameters of the ball match the parameters of said one of the detected moving blurs. Also, the device is further adapted to determine the dimensions of the moving blur being associated with the ball. Moreover, the device is adapted to detect a ball impact, based on a change in dimensions of the moving blur being associated with the ball, in the video. In addition, the device is also adapted to localize the ball impact on a surface, based on the change in the dimensions of the moving blur being associated with the ball, and parameters of the environment.

The present disclosure has presented an implementation example in the form of a sports analysis. This sports analysis may be performed in the cloud and may process data for sports centres such as squash centres with a number of squash courts. Each court may be equipped with a camera that is installed at the back of the squash court and directed towards a front wall of the sports court. In one example the camera may be connected to, for instance, a Raspberry Pi single board computer (SBC).

It is noted that there are two ways to deploy a ball impact localization process: to a cloud datacentre or to the edge of the cloud, for instance to a Raspberry Pi device. The cloud and the Raspberry Pi deployment versions of a detection algorithm may use the same codebase, for which reason it is a configuration decision whether to run the algorithm inside the cloud or on the edge of the cloud.

For a cloud deployment of an algorithm, video data that is captured by a court camera is transmitted to the cloud for localization of ball impacts processing. To reduce the bandwidth needed, video data may be compressed by for instance a Raspberry Pi™ device to H.264 format, and after multiplexing and packetization, the data can be sent on an Internet Protocol (IP) network to the datacentre. At the datacentre, the video data is typically decoded and can then be fed to a detection algorithm.

To further reduce the required upstream bandwidth and reduce a detection latency the ball hit localization process can be deployed directly on for instance a Raspberry Pi™ computer. In this case, a camera stream may be fed directly to the detection algorithm without video compression. The Raspberry Pi computer may be considered to work as a "smart sensor" and is adapted to send only the result of a localization of ball impacts to the cloud for further processing by a sports analytics system.

It is noted that by moving the position of processing closer to the source of the video data, detection latency and the required upstream bandwidth are reduced significantly.

In summary an adaptive technique is given for ball impact localization, where environmental parameters can be dynamically incorporated into the proposed technique for an improved performance, even in changing environments. As mentioned earlier, the processing for the localization of ball impacts and surface hit analysis may be considered to be computationally cheap. For this reason this technique can be implemented in low cost computers or apparatuses devices as a built-in device function of image processing chips/video cards.

Examples and embodiments as described herein have one or more of the following advantages and preferable features:

The proposed technique may be considered to be simple and is easily scalable, and provides a low cost technology to localize ball impacts on surfaces of a sports court of a play-ground.

The technology for determining the position of ball impacts is computationally cheap, such that it can be implemented in embedded devices. Such devices comprise deployments in the cloud and in the cloud edge.

A further advantage is that the localization of ball impacts does not require the ball to be continuously visible in the video.

Yet a further advantage is that the localization of ball impacts does not require the ball to be visible at the time the ball impacts on a surface.

It may be further noted that the above described embodiments are only given as examples and should not be limiting to the present exemplary embodiments, since other solutions, uses, objectives, and functions are apparent within the scope of the embodiments as claimed in the accompanying patent claims.

The invention claimed is:

1. A method for localizing ball impacts on a surface of an environment, the method comprising:
   obtaining, from a video source, video data of a ball in a ball game, the video data comprising video frames;
   detecting one or more moving blurs in a video, based on differences between any two consecutive video frames of the video;
   comparing parameters of the ball with parameters of the detected one or more moving blurs;
   associating one of the detected one or more moving blurs with the ball, when the parameters of the ball match the parameters of the one of the detected moving blurs;
   determining the dimensions of the moving blur being associated with the ball;
   detecting a ball impact in the video based on a change in dimensions of the moving blur associated with the ball; and
   localizing the ball impact on a surface, based on the change in the dimensions of the moving blur associated with the ball and parameters of the environment.

2. The method of claim 1, wherein the detecting one or more moving blurs in the video comprises:
   identifying differences between any two consecutive video frames; and
   calculating a logical AND-operation of any consecutive two of the differences.

3. The method of claim 1, wherein the parameters of the ball and the parameters of the detected one or more blurs are brightness, color, and/or size.

4. The method of claim 1, wherein the associating one of the detected moving blurs with the ball comprises identifying the one of the detected moving blurs as a video recording of the ball in the video.

5. The method of claim 1, wherein the determining the dimensions of the moving blur associated with the ball comprises determining an extension of the moving blur and direction of the extension of the moving blur.

6. The method of claim 5, wherein the detecting the ball impact, based on the change in the dimensions of the moving blur, comprises detecting a ball impact based on the change in the extension and/or a change of the direction of the extension of the moving blur.

7. The method of claim 1, wherein the obtaining video data from a video source comprises obtaining the video data from one or more cameras or from a video stream.

8. The method of claim 1, wherein each video frame of the video data comprises a matrix of video pixels.

9. The method of claim 1, wherein the parameters of the environment comprise physical coordinates of the surface.

10. A device capable of localizing ball impacts on a surface of an environment, the device comprising:
   processing circuitry;
   memory containing instructions executable by the processing circuitry whereby the device is operative to:
      obtain, from a video source, video data of a ball in a ball game, the video data comprising video frames;
      detect one or more moving blurs in a video based on differences between any two consecutive video frames of the video;
      compare parameters of the ball with parameters of the detected one or more moving blurs;
      associate one of the detected moving blurs with the ball when the parameters of the ball match the parameters of the one of the detected moving blurs;
      determine the dimensions of the moving blur associated with the ball;
      detect a ball impact in the video based on a change in dimensions of the moving blur associated with the ball; and
      localize the ball impact on a surface based on the change in dimensions of the moving blur associated with the ball and parameters of the environment.

11. The device of claim 10, wherein the instructions are such that the device is operative to:
   identify differences between any two consecutive video frames of the video data; and
   calculate a logical AND-operation of any consecutive two of the differences when detecting the one or more moving blurs in the video.

12. The device of claim 10, wherein the instructions are such that the device is operative to compare brightness, color, and/or size of the ball with brightness, color and/or size of the detected one or more moving blurs.

13. The device of claim 10, wherein the instructions are such that the device is operative to identify the one of the detected moving blurs as a video recording of the ball in the video.

14. The device claim 10, wherein the instructions are such that the device is operative to determine an extension of the moving blur and direction of the extension of the moving blur.

15. The device of claim 10, wherein the instructions are such that the device is operative to:
   when detecting the one or more moving blurs in the video, identify differences between any two consecutive video frames of the video data, and calculate a logical AND-operation of any consecutive two of the differences;
   identify the one of the detected moving blurs as a video recording of the ball in the video by comparing brightness, color, and/or size of the ball with brightness, color, and/or size of the detected one or more moving blurs;
   determine an extension of the moving blur and direction of the extension of the moving blur.

16. The device of claim 10, wherein the instructions are such that the device is operative to detect a ball impact based on the change in the extension, and/or a change of the direction of the extension of the moving blur.

17. The device of claim 10, wherein the instructions are such that the device is operative to obtain the video data from one or more cameras or from a video stream.

18. The device of claim 10, wherein each video frame of the video data comprises a matrix of video pixels.

19. The device of claim 10, wherein the parameters of the environment comprise physical coordinates of the surface.

20. A non-transitory computer readable recording medium storing a computer program product for controlling a device for localizing ball impacts on a surface of an environment, the computer program product comprising software instructions which, when run on processing circuitry of the device, causes the device to:
   obtain, from a video source, video data of a ball in a ball game, the video data comprising video frames;
   detect one or more moving blurs in a video based on differences between any two consecutive video frames of the video;
   compare parameters of the ball with parameters of the detected one or more moving blurs;
   associate one of the detected moving blurs with the ball when the parameters of the ball match the parameters of the one of the detected moving blurs;
   determine the dimensions of the moving blur associated with the ball;
   detect a ball impact in the video based on a change in dimensions of the moving blur associated with the ball; and
   localize the ball impact on a surface based on the change in dimensions of the moving blur associated with the ball and parameters of the environment.

* * * * *